United States Patent [19]
Ohtagaki et al.

[11] Patent Number: 5,338,058
[45] Date of Patent: Aug. 16, 1994

[54] DAMPING FORCE CONTROL SYSTEM FOR VEHICLE SUSPENSION

[75] Inventors: Shigeki Ohtagaki; Kazunori Miura, both of Hyogo, Japan

[73] Assignee: Mitsubishi Denki Kabushiki Kaisha, Tokyo, Japan

[21] Appl. No.: 948,634

[22] Filed: Sep. 23, 1992

[30] Foreign Application Priority Data

Sep. 25, 1991 [JP] Japan .................. 3-245440

[51] Int. Cl.⁵ .......................................... B60G 17/015
[52] U.S. Cl. ................. 280/707; 364/424.05
[58] Field of Search ............. 280/707; 364/424.05

[56] References Cited

U.S. PATENT DOCUMENTS

| | | | |
|---|---|---|---|
| 4,715,616 | 12/1987 | Asami et al. | 280/707 |
| 4,805,101 | 2/1989 | Dietrich | 280/707 |
| 4,903,983 | 2/1990 | Fukishima | 280/707 |
| 5,072,392 | 12/1991 | Taniguchi | 280/707 |
| 5,101,355 | 3/1992 | Wada | 280/707 |
| 5,163,704 | 11/1992 | Wada | 280/707 |
| 5,173,858 | 12/1992 | Wada et al. | 280/707 |

FOREIGN PATENT DOCUMENTS

| | | |
|---|---|---|
| 0162448 | 11/1985 | European Pat. Off. . |
| 0162449 | 11/1985 | European Pat. Off. . |
| 0265670 | 5/1988 | European Pat. Off. . |
| 55114708 | 2/1954 | Japan . |

*Primary Examiner*—Karin L. Tyson
*Attorney, Agent, or Firm*—Sughrue, Mion, Zinn, Macpeak & Seas

[57] ABSTRACT

A suspension control system for a motor vehicle, includes a vertical accelerating detector for detecting a vertical acceleration of a vehicle body; a damping force changing device for switching suspension damping forces for the front and rear wheels of the vehicle body at least in three steps; a vertical acceleration differential value measuring device for measuring a differential value of an output signal of the vertical acceleration detector; and a damping force hold determining device for setting, according to an output of the vertical acceleration differential value measuring device, damping forces for the front and rear wheels to soft level simultaneously or setting damping forces for the rear wheels only to soft level and maintaining the damping forces.

6 Claims, 5 Drawing Sheets

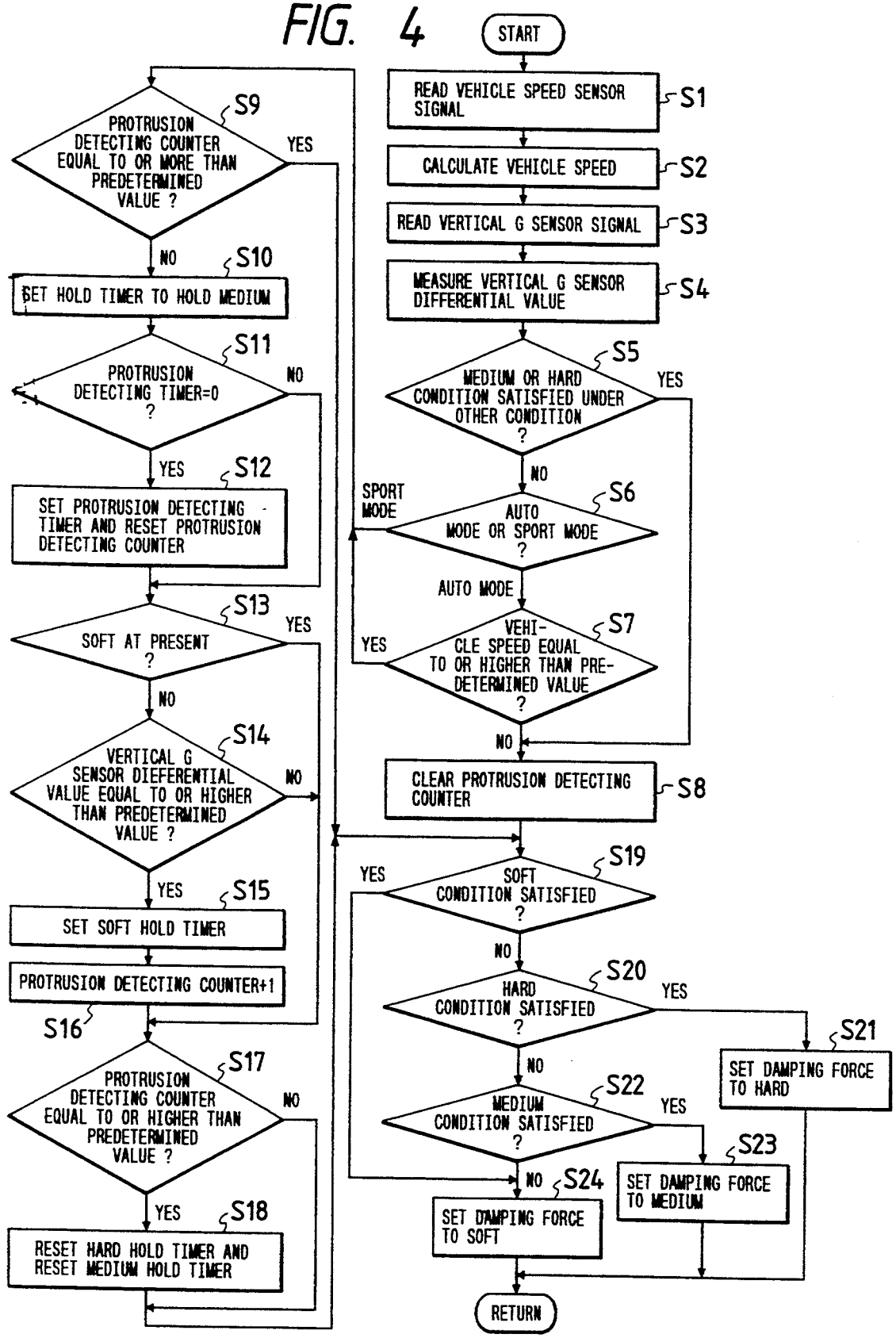

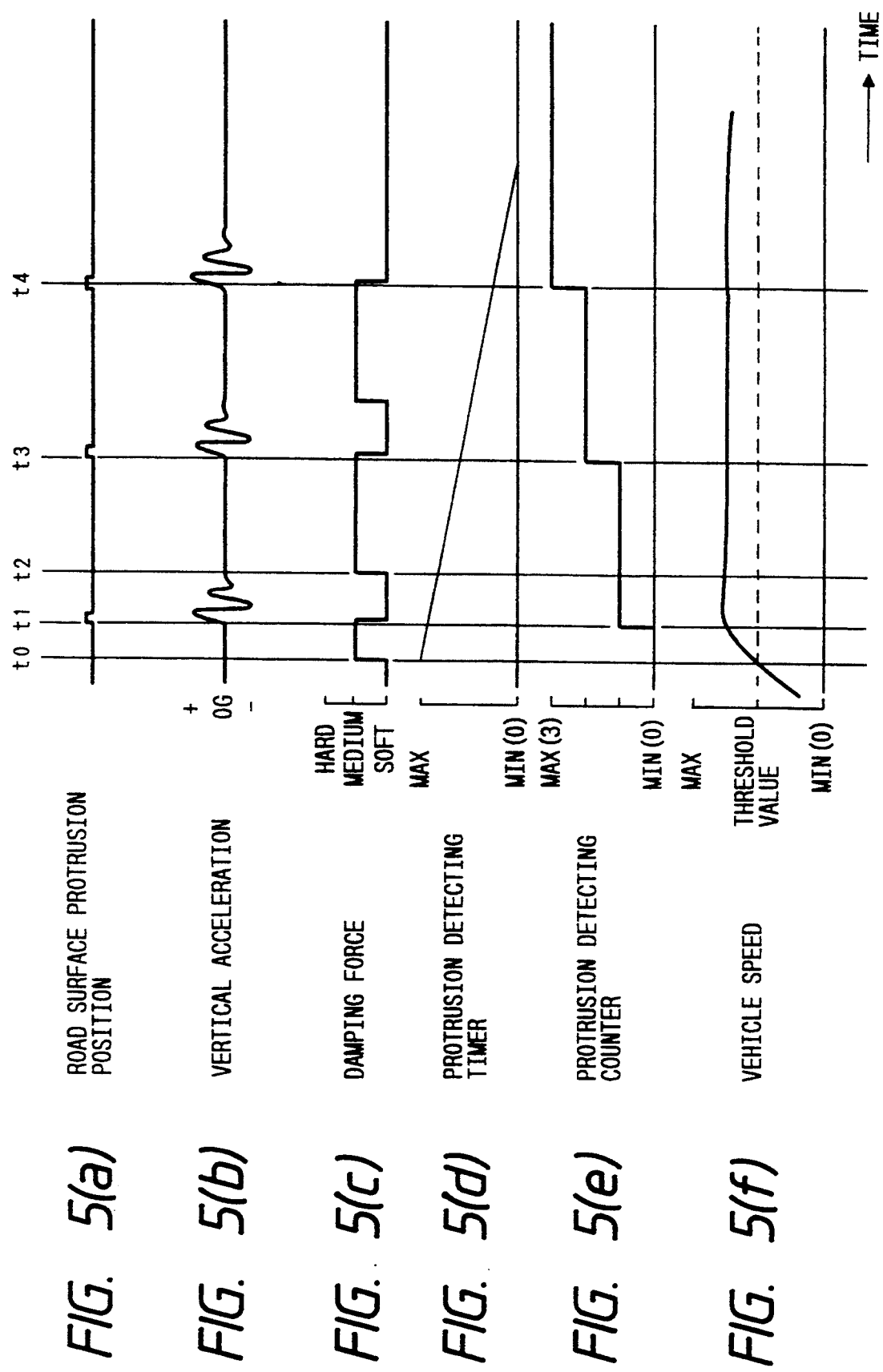

DAMPING FORCE CONTROL SYSTEM FOR VEHICLE SUSPENSION

BACKGROUND OF THE INVENTION

1. Field of the Invention

This invention relates to a suspension control system which is effective in preventing a person in a motor vehicle from being made uncomfortable by shocks which, while the motor vehicle is traveling on a road, are given intermittently to it because of uneven road surfaces.

2. Prior Art

A vehicle suspension control system has been well known in the art which is so designed that the damping forces of shock absorbers are determined according to vehicle driving conditions or optionally thereby to improve the comfortableness which one may feel while driving the vehicle (hereinafter referred to as "vehicle driving comfortableness") or the operability of the vehicle. For instance Japanese Utility Patent Application (OPI) No. 114708/1980 has proposed a vehicle suspension control system in which a vehicle speed is detected from the output signal of a vehicle sensor, and when the vehicle speed thus detected is higher than a predetermined value, the damping forces of the shock absorbers are increased so that the vehicle traveling at high speed is improved in operating stability (hereinafter referred to as "vehicle driving stability").

With the above-described conventional suspension control system, when the vehicle is traveling on a road, it is determined from only the vehicle speed or from the vehicle speed and the number of times of posture controls made for a predetermined period of time whether or not the vehicle driving stability should take precedence over the vehicle driving comfortableness. In addition, only the output of a select switch is utilized to increase the fundamental damping force once or several times. Hence, in practice, even when the vehicle is abruptly shocked for instance while riding protrusions on the road, the suspension does not work.

Another suspension control system has been proposed which is based on the estimation that, once the damping force is increased, then even if the conditions requiring for increasing of the damping force are eliminated, the conditions requiring for the vehicle driving stability may last. Therefore, with the system, the damping force thus increased is held as it is for a predetermined period of time or until the conditions requiring for the vehicle driving stability are eliminated. However, even when the damping forces are held in this manner, the shocks may make the drive uncomfortable when the wheels ride over protrusions on the road. Thus, with the conventional system, it is difficult to make the vehicle driving stability and the vehicle driving comfortableness compatible with each other.

SUMMARY OF THE INVENTION

Accordingly, an object of this invention is to eliminate the above-described difficulties accompanying a conventional vehicle suspension control system. More specifically, an object of the invention is to provide a suspension control system with which, when the damping force is high, the damping is set at a soft level instantly, and is held as it is at least for a predetermined period of time, so that shocks which may be given to the vehicle body depending on conditions of the road surface are lessened, whereby the vehicle can be operated with vehicle driving stability and vehicle driving comfortableness in balance.

The foregoing object of the invention has been achieved by the provision of a suspension control system for a motor vehicle, which, according to the invention, comprises: vehicle body vertical accelerating detecting means for detecting a vertical acceleration of a vehicle body, damping force changing means for switching suspension damping forces for the front and rear wheels of the vehicle body at least in three steps synchronously or asynchronously; vertical acceleration differential value measuring means for measuring the differential value of an output signal of the vehicle body vertical acceleration detecting means; damping force hold deciding means for setting, according to the output of the vertical acceleration differential value measuring means, damping forces for the front and rear wheels to soft level simultaneously or setting damping forces for the rear wheels only to soft level and maintaining the damping forces thus set; and road surface condition deciding means for utilizing the output of the damping force deciding means to measure the control period and control frequency thereof, thereby to decide the conditions of the road surface.

The suspension control system of the invention operates as follows: In the case where the vehicle suspension damping force is set to a relatively high value, and the vehicle body is shocked intermittently while the wheels riding small protrusions on the road, the differential value measuring means measures the output signal of the vehicle body vertical acceleration detecting means, and the protrusions are detected from the result of measurement so that the damping force is held at soft level for a predetermined period of time, whereby the shocks are minimized which may be given to the vehicle body when the wheels ride the protrusions on the road.

Furthermore, in the case where the vehicle suspension fundamental damping force is set at a relatively high value, and the road surface condition deciding means determines it from the period and frequency of detection of small protrusions on the road that, if the damping force is held as it is, then the vehicle driving comfortableness will be worsened, the system operates as follows: That is, until the conditions requiring for setting the damping force to a relatively high value are established next, the damping force hold determining means operates to cause the damping force changing means to hold the damping force at soft level.

BRIEF DESCRIPTION OF THE DRAWINGS

FIG. 4 is a flow chart for a description of the operation of the suspension control system of FIG. 1; and FIG. 5a, FIG. 5b, FIG. 5c, FIG. 5d, FIG. 5e and FIG. 5f are a time chart for a description of the operation of the suspension control system of FIG. 1.

DETAILED DESCRIPTION OF THE PREFERRED EMBODIMENTS

Figure 1:
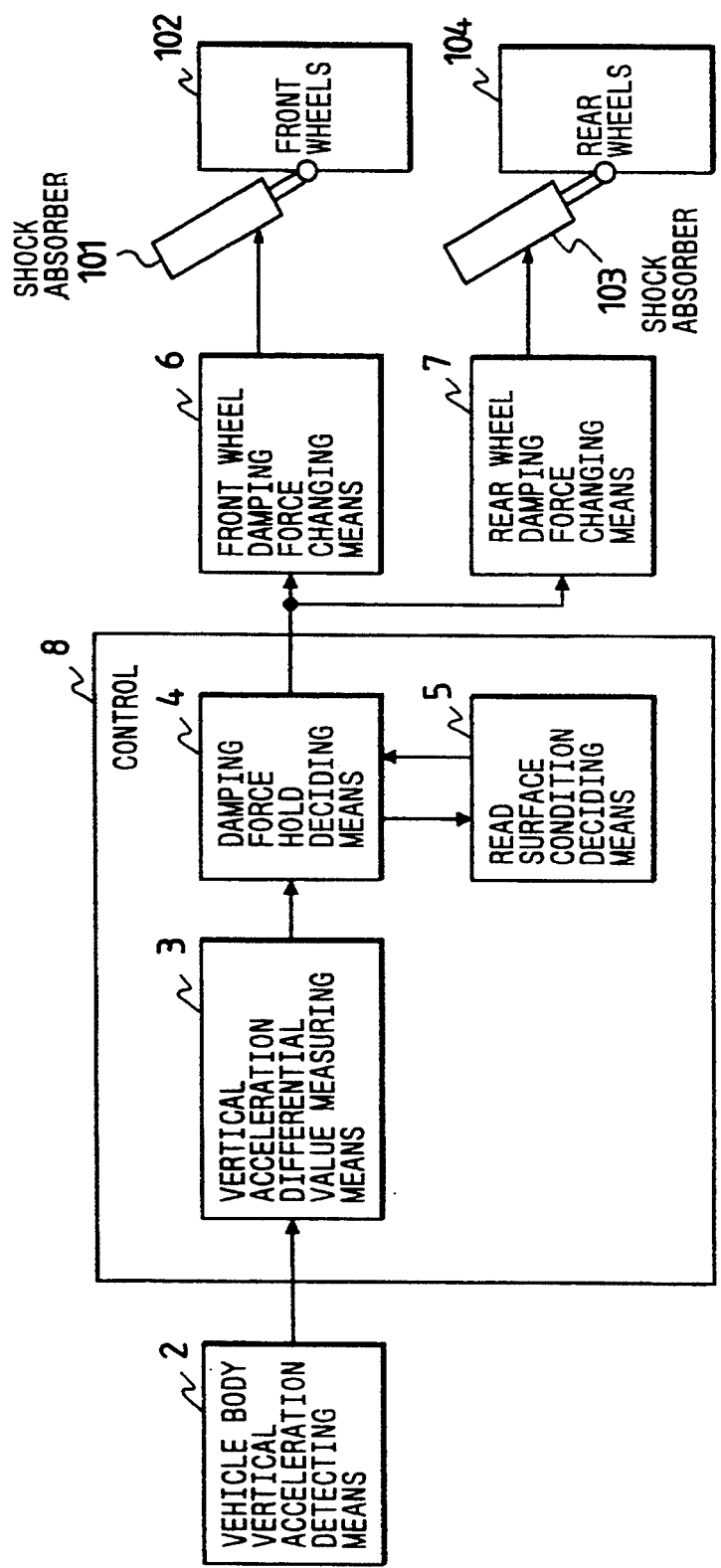
FIG. 1 is a block diagram showing the fundamental arrangement of a suspension control system according to one embodiment of this invention.

One preferred embodiment of this invention will be described with reference to the accompanying drawings. FIG. 1 is a block diagram showing a fundamental arrangement of the embodiment. In FIG. 1, reference numeral 2 designates a vehicle body vertical acceleration detecting means for detecting a vertical acceleration of the vehicle body. The detection output of the detecting means 2 is applied to vertical acceleration differential value measuring means 3.

The vertical acceleration differential value measuring means 3 together with damping force hold deciding means 4 and road surface condition deciding means 5 form a control unit 8. The vertical acceleration differential value measuring means 3 is to measure the differential value of a vertical acceleration. The output of the measuring means 3 is applied to the damping force hold deciding means 4.

The damping force hold deciding means 4 operates to change or hold the damping force according to the differential value of acceleration outputted by the measuring means 3. In response to an output of the damping force hold deciding means 4, the road surface condition deciding means 5 decides how the road surface is, and applies the result of decision to the damping force hold deciding means 4. That is, the road surface condition deciding means measures a period and frequency of setting the damping forces to a soft level according to an output of the damping force hold determining means and maintains the damping force at a soft level when detecting a road surface which is unsuitable for a high damping force.

Specifically, an output of the damping force hold deciding means 4 is supplied to front wheel damping force changing means 6 and rear wheel damping force changing means 7. The front wheel damping force changing means 6 and the rear wheel damping force changing means 7 are adapted to control shock absorbers 101 and 103, respectively.

The shock absorber 101 is provided between the vehicle body and each of the front wheels 102. Similarly, the shock absorber 103 is provided between the vehicle body and each of the rear wheels 104.

Figure 2:
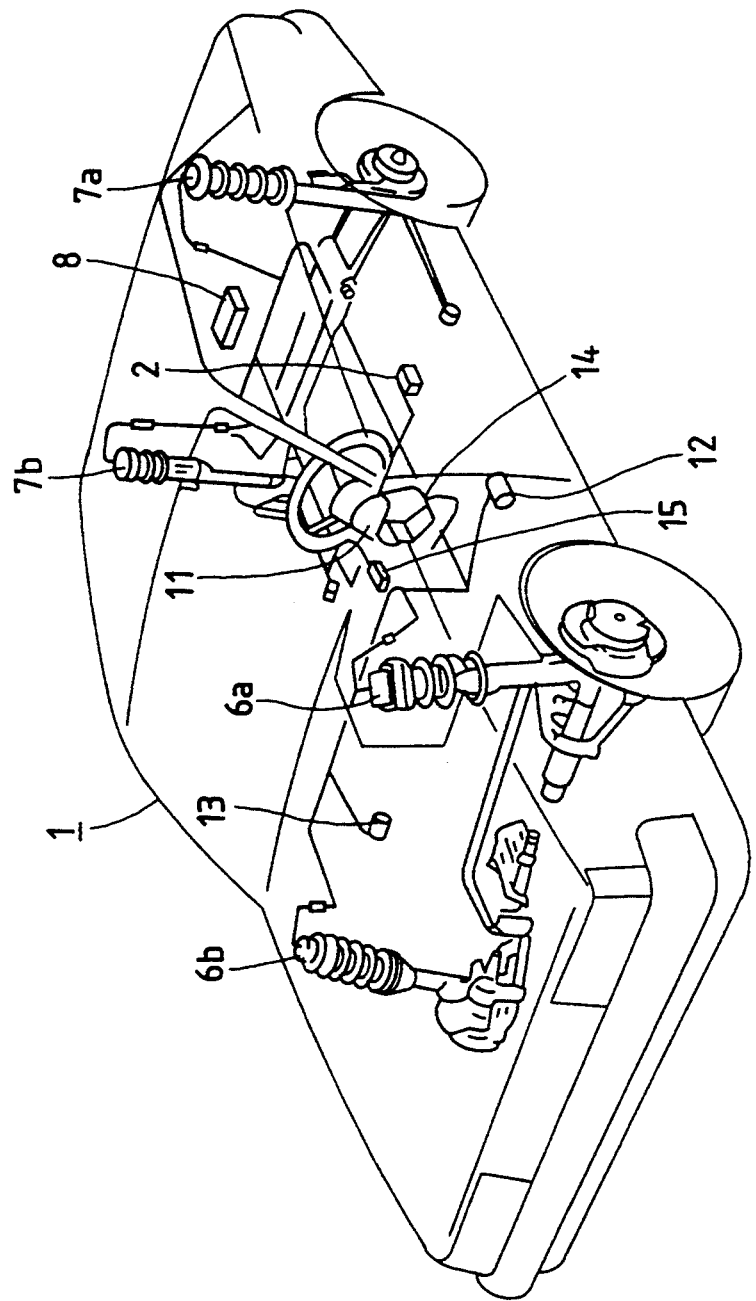
FIG. 2 is a perspective view showing the arrangement of a control unit and other components relevant thereto in the suspension control system of FIG. 1 which are mounted on a motor vehicle.

Now, the embodiment will be described with reference to FIGS. 2 and 3. FIG. 2 is a perspective view showing the arrangement of circuit elements which are connected to the control unit 8 and mounted on the vehicle body 1, and FIG. 3 is a block diagram showing the connection of those circuit elements.

Figure 3:
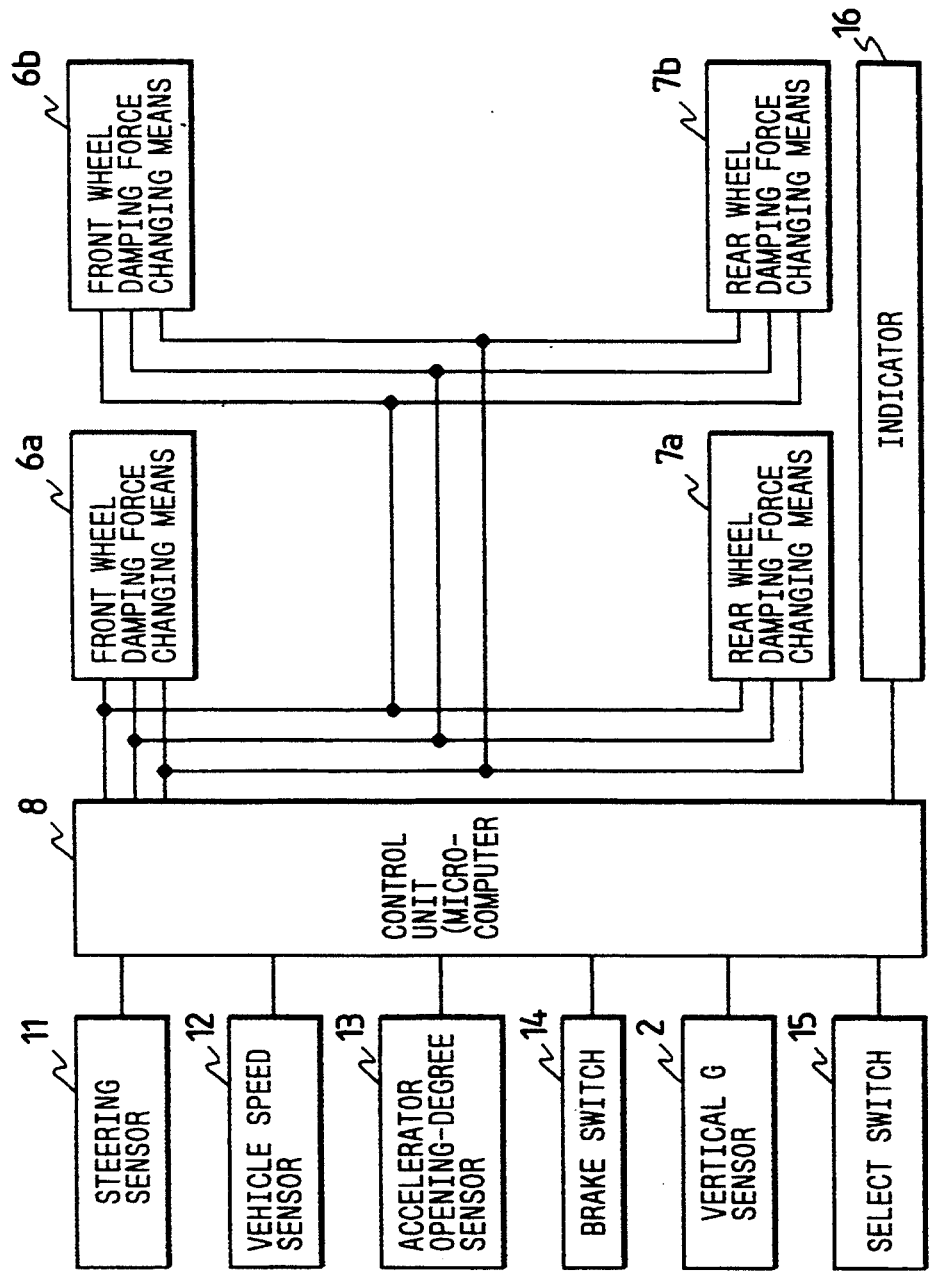
FIG. 3 is a block diagram showing the connection of the control and the components shown in FIG. 2.

As shown in FIGS. 2 and 3, the vehicle body 1 is provided with a steering sensor 11 for detecting the operation of the steering wheel, vehicle speed detecting means, namely, a vehicle speed sensor 12, an accelerator opening-degree sensor 13 for detecting the operations of acceleration and deceleration of the vehicle body 1; a brake switch 14, a select switch 15, and an indicator 16.

The outputs of the steering sensor 11, the vehicle speed sensor 12, the accelerator opening-degree sensor 13, the brake switch 14, and the select switch 15 are applied to the control unit 8, which controls the front wheel damping force changing means 6, the rear wheel damping force changing means 7, and the indicator 16.

The vehicle body vertical acceleration detecting means 2 is a vertical acceleration sensor for detecting acceleration in a vertical direction (hereinafter referred to as "a vertical G sensor 2"). It may be of acceleration pickup type with a piezo-electric element, or of differential transformer type, or it may be a vehicle acceleration sensor of semiconductor-operated distortion gauge type.

In the embodiment, the vertical G sensor 2 is installed at the gravity center of the vehicle body. However, it should be noted that the vertical G sensor 2 may be mounted on the vehicle body at the front end, or two vertical G sensors 2 may be mounted on the vehicles respectively at the front and rear ends, or the vertical G sensor may be provided for each of the suspension units of the wheels.

The vertical G sensor 2 operates to linearly output a vertical acceleration in the form of an analog voltage, with its output as a reference which is provided when the acceleration is zero. The output of the vertical G sensor 2 is subjected to A/D (analog-to-digital) conversion, and then applied to the control unit 8 comprising a microcomputer, where the signal level variation of the vertical G sensor 2, and acceleration differential value are calculated.

Now, the operation of the suspension control system according to the invention will be described with reference to a flow chart of FIG. 4. The time instant t0 shown in FIG. 5 (which is a diagram indicating the vertical vibration of the vehicle body with the lapse of time, for a description of the operation of the system) occurs before the front wheel rides over a protrusion on the road. In FIG. 4, in Step S1, the output of the vehicle speed sensor 12 is read, and thereafter in Step S2, the vehicle speed is calculated.

Next, in Step S3, the output of the vertical G sensor 2 as shown in FIG. 5(b) is read. In Step S4, the differential value of the output level of the vertical G sensor 2 is measured. Thereafter, Steps S5 and S6 are effected.

In Step S5, is is determined whether or not medium or hard condition is satisfied under other condition. In Step S6, the mode of the damping force selected with the select switch 15 is decided. That is, in the case of an auto mode, the damping force is normally at soft level; and in the case of a sport mode, it is normally at medium level (FIG. 5(c)). In this case, the auto mode being selected, Step S7 is effected.

In Step S7, it is determined whether or not the vehicle speed calculated in Step S2 is equal to or higher than a predetermined value. In this case, the vehicle speed is equal to or higher than the predetermined value, and therefore Step S9 is effected. In Step S9, the number of protrusions detected is decided from the output of a protrusion detecting counter as shown in FIG. 5(e). That is, when a predetermined number of protrusions are counted in a predetermined period of time, Step S19 is effected, and the damping force is held at soft level.

In this case, the counter value is zero (0), and therefore Step S10 is effected. In Step S10, a hold timer is set to maintain the damping force at medium level, and then Step S11 is effected. In Step S11, when the damping force is at middle level or higher, the contents of a timer for performing a time counting operation for a predetermined period of time; that is, the timer value is subjected to decision. When the timer value is zero (0), the timer is set, and the counter is initialized, as a result of which a counter value less than a predetermined number of times is nullified. In this case, the timer value is zero (0). Therefore, in Step S12, the timer is set to a predetermined period of time, and the counter value is initialized (for zero). Then, Step S13 is effected.

In Step S13, it is determined at what level the present damping force is. The present damping force is at soft level, and therefore Step S17 is effected. In Step S17, it is determined whether or not the count value of the protrusion detecting counter which is incremented in Step S16 is equal to or higher than a predetermined value. The count value is not higher than the predetermined value, Step S19 is effected.

In Steps S19 through S24, the damping force is controlled to be at medium level as set in Step S10.

Now, the operations of the control unit 8 performed at the time instant t1 will be described. In Step S1, the signal of the vehicle sensor 12 is read, and then in Step S2, a vehicle speed is calculated.

In Step S3, the output signal of the vertical G sensor 2 is read. Thereafter, in Step S4, the differential value of a vertical acceleration is measured. The damping force being in the auto mode, the vehicle speed is still higher than the predetermined value. Hence, Steps S5, S6, S7, S9, S10 and S11 are effected in the stated order.

In Step S11, the value of a protrusion detecting timer is not zero (0), and therefore Step S13 is effected. In Step S13, the present damping force is at medium level, and therefore Step S14 is effected.

At the time instant t1, the differential value of the output of the vertical G sensor 2 measured in Step S4 has been changed equal to or larger than the predetermined value because of a protrusion on the road. Therefore, in Step S14, it is determined that shocks from the road surface should be suppressed, and therefore Step S15 is effected. In Step S15, a soft level holding timer is set. Thereafter, Step S16 is executed.

In Step S16, the protrusion detecting counter (initial count value=0) is up-counted. Then, Step S17 is effected In Step S17, the count value of the protrusion detecting counter is not equal to or higher than the predetermined value, and therefore Step S19 is effected.

In Steps S19 through S24, the damping force is set at soft level with the aid of the soft holding timer which has been set in Step S15, so that at least the shock is suppressed which is given when the rear wheel rides the protrusion. The damping force is maintained held at soft level at least until the time instant t2 when the rear wheel moves over the protrusion.

Now, the operations of the control unit 8 performed at the time instants t3 and t4 will be described. Similarly, as in the case of the time instant t2, the vehicle speed is calculated, and the differential value of the vertical acceleration is measured. Then, Steps S5 and S6 are effected.

Similarly as in the case of the time instant t2, the damping force is in the auto mode, and the vehicle speed is higher than the predetermined value, and therefore Steps S6, S7, S9, S10, S11, S13 and S14 are effected one after another. Before the time instants t3 and t4, the damping force is at medium level, and the differential value is detected larger than the predetermined value. Hence, Steps S15 and S16 are performed.

In Step S16, the protrusion detecting counter is up-counted, and thereafter Step S17 is effected. At the time instant t4, the count value of the protrusion detecting counter in the predetermined period of time reaches the predetermined value (N=3) or larger. Therefore in the case where the damping force is set to a relatively high value, it is decided that the road surface makes the vehicle driver uncomfortable while driving the vehicle. Step S18 is effected. In Step S18, a timer for holding a damping force at hard level, and the timer for holding a damping force at medium level are cleared, and then Step S19 is effected to hold the damping force at soft level.

This state is eliminated by clearing the protrusion detecting counter when in Step S5 the damping force is increased because of other conditions, or when in Step S7 the vehicle speed is lower than the predetermined value.

Thus, the suspension control has been accomplished. In the above-described embodiment, the damping forces for the front and rear wheels are switched synchronously; however, they may be switched asynchronously. In this connection, it should be noted that the same effects can be obtained by switching the damping forces at least for the rear wheels. In the above-described embodiment, the damping force is switched in three steps; however, it goes without saying that the same effects can be obtained by switching it in more than three steps.

As was described above, in the case where the shock absorber damping force is held at a relatively high value for enhancement of the vehicle driving stability, or the fundamental damping force is optionally set to a relatively high value, the shocks which may be given to the vehicle body when the wheels ride small protrusions on the road are detected from the differential value of the output signal of the vertical G sensor mounted on the vehicle body, so that immediately the damping forces for the front and rear wheels, or the damping forces at least for the rear wheels, are decreased. That is, the intermittent shocks can be lessened which may given to the vehicle body when the wheels ride the small protrusions.

In the case where, after both the front and rear wheels have ridden protrusions, it is necessary to increase the damping force depending on the output of the damping force holding timer or fundamental damping force increasing conditions, immediately the damping force is switched over to the fundamental damping force for enhancement of the vehicle driving stability.

Furthermore, in the case where small protrusions are detected frequently on the road; for instance in the case where the fundamental damping force is held at a relatively high value, and the vehicle wheels ride small protrusions on the road, such as the seams of road surfaces of a high way, successively with a short period, the system operates as follows: That is, when, after a protrusion is detected on the road, a predetermined number of protrusions are detected in a predetermined period, the damping forces for both the front and rear wheels are decreased until the conditions requiring for increasing the damping forces occur next. Hence, switching of the damping forces is decreased in frequency as much, and the vehicle driving comfortableness is improved accordingly.

What is claimed is:

1. A suspension control system for controlling suspension damping of a motor vehicle when said vehicle experiences shock due to protrusions in a road, comprising:

vertical accelerating detecting means for detecting a vertical acceleration of a vehicle body when said body is subjected to said shock;

damping force changing means for switching suspension damping forces for front and rear wheel soft said vehicle body at least in three steps;

vertical acceleration differential value measuring means for measuring a differential value of an output signal of said vertical acceleration detecting means; and damping force hold determining means for changing damping forces for at least the rear wheels to a soft level and maintaining said damping forces at said soft level for a period of time while at least the rear wheels are riding over the protrusions in the road when an output signal of the vertical acceleration differential value measuring means exceeds a predetermined value and when the damping force of the rear wheel is at a level higher than said soft level.

2. A suspension control system as claimed in claim 1, further comprising:

road surface condition deciding means for measuring a period and frequency of setting said damping forces to soft level according to an output of said damping force hold determining means, and for maintaining said damping forces at soft level based on said measurement.

3. A suspension control system as claimed in claim 1, wherein said differential value measuring means, said damping force hold determining means and said detecting means constitute a control means and wherein said control means further includes a vehicle sensor for outputting a signal representing a vehicle speed, a steering sensor for detecting an amount of operation of a steering wheel, a brake switch for determining whether a brake has been operated or not, a throttle opening-degree sensor for producing a signal representing a degree of opening of a throttle valve, and a select switch for setting a damping force of a shock absorber of said vehicle to a relatively high value and maintaining said damping force.

4. A suspension control system as claimed in claim 1, in which said damping force changing means switches the suspension damping forces for the front and rear wheels of said vehicle body independently.

5. A suspension control system as claimed in claim 1, in which said damping force changing means switches the suspension damping forces for the front and rear wheels of said vehicle body synchronously.

6. The suspension control system of claim 1, wherein said determining mean sets said damping forces to said soft level after a predetermined number of said protrusions have been counted within a predetermined time period.

* * * * *